July 23, 1957 S. S. STURGEON 2,800,016
MAGNETIC FLOW MEASURING APPARATUS
Filed Sept. 14, 1954 2 Sheets-Sheet 1

INVENTOR
Stocker S. Sturgeon
BY
Curtis, Morris & Safford
ATTORNEYS

July 23, 1957 — S. S. STURGEON — 2,800,016
MAGNETIC FLOW MEASURING APPARATUS
Filed Sept. 14, 1954 — 2 Sheets-Sheet 2

INVENTOR
Stocker S. Sturgeon
BY
Curtis, Morris & Safford
ATTORNEYS

United States Patent Office 2,800,016
Patented July 23, 1957

2,800,016

MAGNETIC FLOW MEASURING APPARATUS

Stocker S. Sturgeon, Foxboro, Mass., assignor to The Foxboro Company, Foxboro, Mass., a corporation of Massachusetts Application September 14, 1954, Serial No. 455,949

2 Claims. (Cl. 73—194)

This invention relates to electromagnetic flowmeters. More in particular, this invention relates to improved means for making electrical contact with the fluid flowing through such a device.

A typical electromagnetic flowmeter, also commonly referred to as an induction flowmeter, includes a pipe section though which passes the fluid whose flow rate is to be measured, means for producing a magnetic field transversely of the direction of fluid flow through the pipe, and a pair of electrodes in contact with the fluid and positioned in the interior of the pipe on a line transverse to both the direction of magnetic flux and the direction of fluid flow. In accordance with known electromagnetic principles, the movement of the fluid in the pipe generates between the electrodes a voltage the magnitude of which is a function of the rate of flow. The voltage so generated may be amplified to a suitable power level and used, for example, to operate one or more of a variety of recording or flow controlling devices.

Various induction flowmeter designs have been suggested from time to time in the past, but none of these has been capable of meeting practical industrial requirements in a satisfactory manner. One of the special problems that has been encountered with such devices has been the provision of means for making electrical connection to the fluid, for the purpose of measuring the electromotive force generated by the fluid as it moves transversely of the magnetic lines of force.

For example, in many operating systems, the fluid whose flow rate is to be measured is under considerable pressure. Such a condition has made it difficult to insert electrical probes through the pipe wall, since the fluid pressure tends to cause leakage and other undesirable effects. This pressure problem is made more severe when, as it desirably is in most cases, the pipe section is constructed by electrically conductive material, since the electrical probes must be insulated from the pipe section to prevent short-circuiting of the generated electromotive force.

The fluid-contacting probes must also be suitably arranged and constructed to withstand and to perform stably under a variety of conditions, either singly or in combination, that are common to many industrial flow systems. For example, the fluid may contain corrosive or otherwise chemically active ingredients, or it may be at an elevated temperature, or it may contain solid particles that tend to form a build-up along the interior surface of the pipe. Additionally, the flowmeter may frequently be installed where it is subject to severe environmental conditions, such as shock and vibration, and the fluid-contacting probes must be capable of satisfactory operation under such conditions.

Accordingly, it is an object of this invention to provide electrical probes, for use with an induction flowmeter, that are superior to those used theretofore. It is a further object of this invention to provide such probes, and means for mounting the same, that are capable of stable performance for long periods of time under a wide variety of adverse operational conditions.

In an embodiment of the invention described hereinbelow in more detail, the pipe wall is provided with two holes spaced 180 degrees around the pipe circumference. Each hole is deeply chamfered from the interior of the pipe, resulting in a "cone-shaped" opening with the larger aperture of the cone (i. e. the "base") facing interiorly. Seated against the sloping walls of this opening is a plastic insulating liner, in the form of a hollow truncated cone and having a uniform wall thickness.

Positioned within the hollow interior of the insulating liner and in contact with the inner surface thereof, is a fluid probe comprising a cone-shaped electrode, the base of which is slightly rounded and approximately flush with the interior wall surface of the pipe, and the apex of which is flared out in the form of a threaded rod-like stem protruding out through the hole in the pipe wall. An output lead wire terminal, suitably insulated from the pipe wall, is secured to the stem by a pair of nuts which, when turned down tight, serve also to hold the conical portion of the electrode firmly against the insulating liner.

It may be noted that with such an arrangement, the fluid pressure within the induction flowmeter pipe section tends to seat the electrode more firmly against the insulating liner, and hence assures a tight, leak-proof electrical connection. Other objects, aspects, and advantages of the present invention will be apparent from, or pointed out in, the following description considered together with the accompanying drawings, in which.

Figure 1:
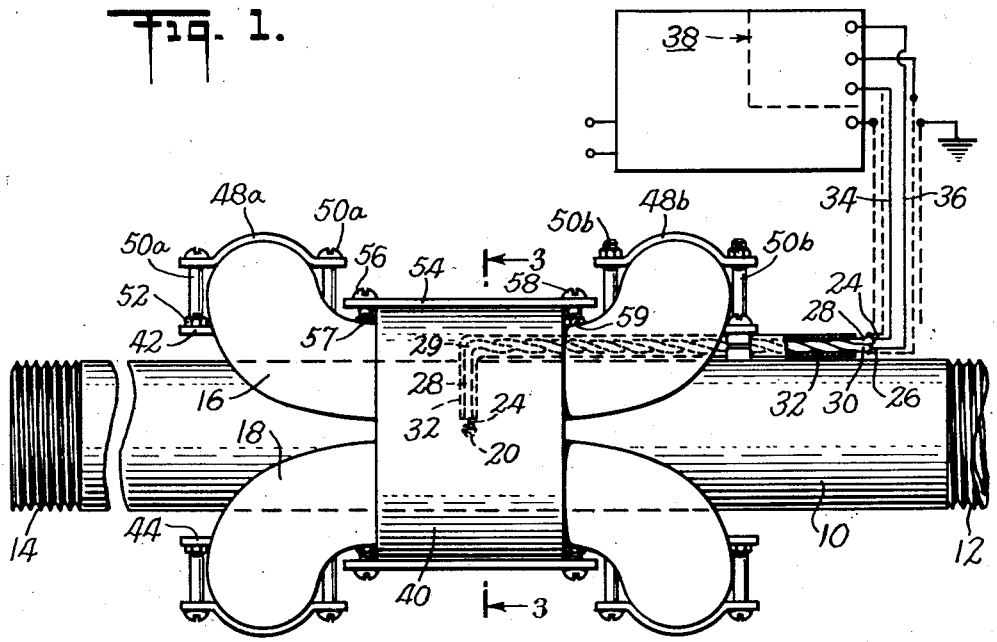
Figure 1 is a side elevation view of an induction flowmeter including contact electrodes in accordance with the present invention.
Figure 2:
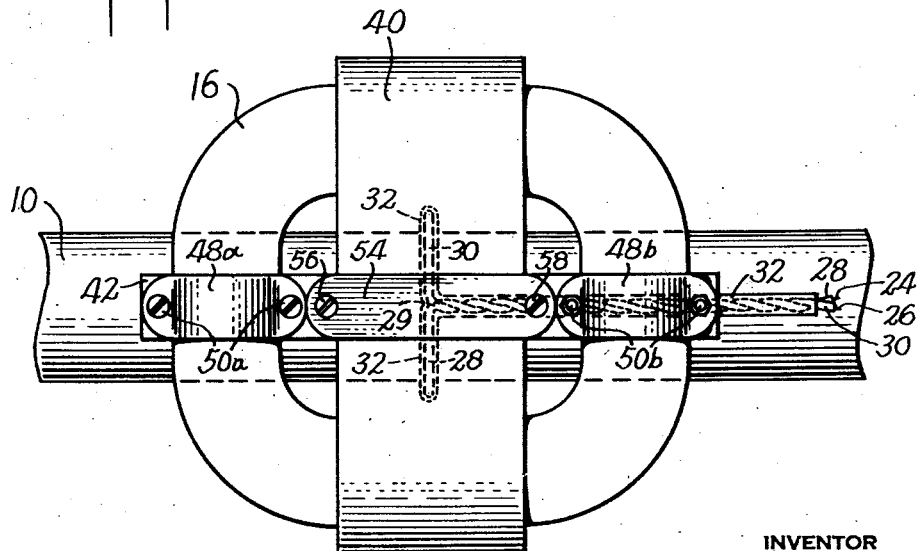
Figure 2 is a plan view of the flowmeter of Figure 1.

Referring now to Figure 1, the fluid whose flow rate it is desired to measure passes through a section of stainless steel pipe 10, the opposite ends 12 and 14 of which are threaded so that the pipe may readily be coupled into an operating flow system (not shown). In the embodiment described herein, the pipe 10 has an inside diameter of approximately two inches and a wall thickness of approximately three-sixteenths of an inch. Other pipe sizes, may, of course, be employed, with suitable changes in the dimensions of the associated flowmeter elements as described herein. The interior wall of the pipe is normally provided with a layer of insulating material, advantageously formed by baking a vitreous enamel directly on the pipe inner wall, or by coating the interior surfaces with a thin layer of chemical and heat-resistant plastic.

Positioned around the pipe 10, and approximately centrally disposed between the two ends thereof, is a magnetic flux producing structure consisting of an upper coil 16 and a lower coil 18. These two coils are identical as to shape, number of turns, size of wire, etc., and are energized by a source of alternating current (not shown), for example the usual line source of 110 volts and having a frequency of 60 cycles per second. The coils are positioned symmetrically about the pipe axis, i. e. "back-to-back," and their respective lead-in wires (not shown) are connected in parallel with the source of alternating current. The coil energizing connections, furthermore, are made in such a manner that the magnetic fields produced by the coils are additive, i. e. the coils are energized in phase with each other, so that when the flux produced by one coil in the center thereof is directed upwardly, the flux produced by the other coil in the center thereof is also directed upwardly, and vice versa.

Surrounding the two coils 16 and 18 in a continuous laminated core 40, formed of any transformer iron but preferably of silicon steel, and serving as a split return path of low reluctance for the flux passing through the pipe 10. That is, flux passing downwardly through the pipe divides into two components when it reaches the lower horizontal portion of the core 40, the two components traveling horizontally away from the center of the pipe, up the vertical sides of the core, and inwardly along the upper horizontal core portion where they combine again and turn downwardly through the pipe to complete the path. The laminations tend to reduce eddy current losses in the usual manner, and the core advantageously is potted with a suitable compound to minimize hum effects.

The coils 16 and 18 and the core 40 are supported by parallel bridge members 42 and 44 extending longitudinally of the pipe 10 on opposite sides thereof. These bridges are identical, and may be secured to the pipe by small arch members (not shown), which may, for example, be welded to both the pipe and the corresponding bridge. Since the upper and lower coil and core support structures are similar, the details of the upper support only will be described.

In the two places where the coil 16 passes transversely over the top of the pipe 10, it is fastened in position by curved clamps 48a and 48b which are shaped to fit snugly over the outer surfaces of the coil. Each of these clamps is secured to the bridge 42 by two bolts 50a and 50b threadedly engaged with corresponding holes extending through the bridge, the bolts being locked into position by nuts 52. Similarly, the core 40 is held in position, where it passes over the top of the pipe 10, by a flat plate 54 which is fastened to the bridge 42 by two bolts 56 and 58 threaded into holes in the bridge and locked in place by nuts 57 and 59.

The details of such a coil and core arrangement are disclosed more fully in U. S. patent application Serial No. 455,922, filed by Neil E. Handel, et al. on September 14, 1954. It may be noted, however, that the magnetic field produced by the combination of two such coils is substantially uniform throughout the important sectional region within the pipe where the flow-responsive electromotive force is to be generated; and that the intensity of the field is essentially independent of the magnetic properties of the return path core.

Figure 3:
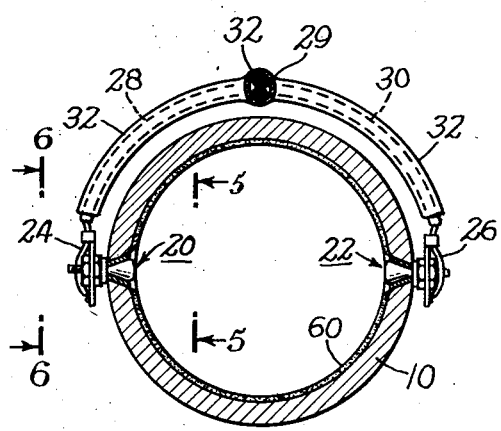
Figure 3 is a cross-section taken along lines 3—3 of Figure 1.

As shown in Figure 3, the flowmeter includes a pair of fluid-contacting electrodes 20 and 22 positioned 180 degrees apart in the wall of the pipe 10. The external stems of the electrodes 20 and 22 are connected respectively to output lead wires 24 and 26, which preferably are insulated with a heat resistant plastic coating such as the type known commercially as Teflon. These leads extend upwards through copper shield tubes 28 and 30 which are joined together at 29, for example by soldering, at the center top of the pipe so as to form "saddle" around the pipe 10 in a plane generally perpendicular to the pipe axis.

From their juncture, the shield tubes and the leads therein extend (see Figure 1) to the right along the top, and parallel to the axis, of the pipe 10, and are twisted together to increase their structural rigidity as well as to reduce inductive pick-up from the flowmeter coils and from neighboring electrical equipment. The shield tubes also advantageously are enclosed in an insulating sheath 32 which may be formed of a fiberglass-silicone composition, and which preferably completely covers the copper tubes down to a point adjacent the electrodes.

At their right hand ends, the lead wires 24 and 26 are connected, through leads diagrammatically shown at 34 and 36, to an electronic amplifier generally indicated as block 38. This amplifier may be supplied with A.-C. power from the usual 110 volt line, and the amplified output signal will normally be coupled to a standard recorder, flow controller, etc. (not shown). The copper shield tubes 28 and 30 may also be connected to the chassis of the amplifier, as disclosed more fully in U. S. patent application Serial No. 455,924, filed by Neil E. Handel, et al. on September 14, 1954, in order to provide a symmetrical reference point and to minimize the influence of circulating ground currents.

Figure 4:
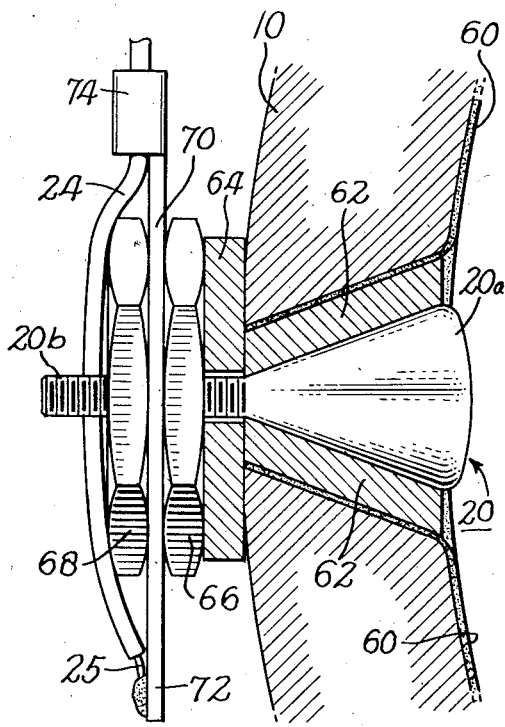
Figure 4 is an enlarged detail of the left hand portion of Figure 3.

Referring now to Figure 4, which is an enlarged fragmentary section of one of the electrodes and its mounting arrangement, the pipe wall 10 is provided with a cone-shaped hole through which the electrode generally indicated at 20 extends. Such a hole may readily be formed, for example by first drilling a small pilot bore from the outside of the pipe, and then passing the shank of a bevelled counterbore through the bore from the interior of the pipe, so that the shank may be gripped exteriorly of the pipe and rotated in the usual manner to suitably enlarge the pilot bore. The large inner aperture of the hole may, for example, have a diameter of about 0.2 inch, and the inside lips of the hole preferably are rounded, as by hand abrasive to assure freedom from sharp corners. The inclined angle between the sloping sides may be approximately 40 degrees, with the outer aperture diameter being about 0.1 inch.

After the cone-shaped hole has been formed, the entire inner wall of the pipe 10, preferably including the sloping walls of the holes, is coated with a thin insulating film as shown at 60. This coating should be only thick enough to assure freedom from small "pin-holes" and the like so as to prevent short-circuiting of the flow-generated electromotive force by the conductive metal pipe 10.

Inserted into the hole drilled through the pipe wall, and approximately flush with the outer and inner pipe surfaces, is a hollow truncated-cone insulating liner 62, preferably formed of a heat and chemical-resistant plastic such as Teflon. This liner has a uniform wall thickness, and is shaped to fit snugly against the sloping inner surfaces of the conical hole in the pipe wall. The insulating liner 62, may, for example, have an inner diameter at the base of the cone of about 0.14 inch, and an inner diameter at the smaller end of about 0.03 inch. Advantageously, the insulating film 60 extends smoothly down between the liner and the pipe wall so as to assure a snug fit between the two, and to present to the fluid passing through he pipe a continuous insulated surface around the electrode 20.

Figure 5:
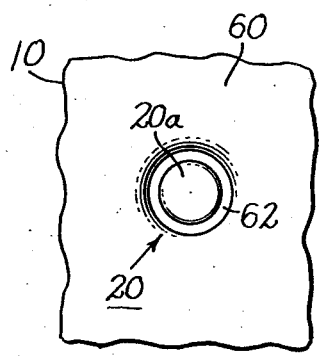
Figure 5 is an enlarged sectional view taken along lines 5—5 of Figure 3.

Seated firmly and snugly in the interior of the insulating liner 62 is the fluid-contacting electrode 20, comprising a cone-shaped base portion 20a and an outwardly protruding stem 20b. This electrode is preferably formed of stainless steel with an overall length of about five-sixteenths of an inch, and the inner face of the base portion is rounded slightly and extends a very small distance into the interior of the pipe 10. The smooth contour presented by this button-like configuration is well adapted to assure good electrical connection with the fluid flowing in the pipe, and to prevent any build-up of sediment or the like passing through the pipe. Figure 5 shows the appearance of the electrode and insulating liner as viewed from the interior of the pipe.

The larger diameter of the base portion 20a, i. e. the diameter of that portion of the electrode in contact with the fluid in the pipe 10, advantageously is approximately one tenth the pipe diameter, e. g. between about 7% and 12%; and for certain applications an electrode diameter as high as 20% of the pipe diameter has been found to give superior results. Such electrode sizing produces a desirably low internal impedance in the flowmeter (which is effectively a generator) without causing any excessive short-circuiting of the generated electromotive forces.

Pressed against the outer flush surfaces of the pipe 10 and the insulating liner 62, and encircling the electrode stem portion 20b, is an insulating ring 64 which may for example be formed of a fiberglass-silicone composition. This insulating ring prevents electrical contact between the electrode and the pipe wall, and may have a thickness of about one thirty-second of an inch and an inner diameter of about 0.04 inch.

The electrode stem portion 20b is threaded to receive two hexagonal nuts 66 and 68, the right hand one 66 of which is adapted, when turned, to pull the electrode 20 outwardly and jam it tightly against the insulating liner 62 so as to form a solid mechanical connection not subject to fluid leakage.

Figure 6:
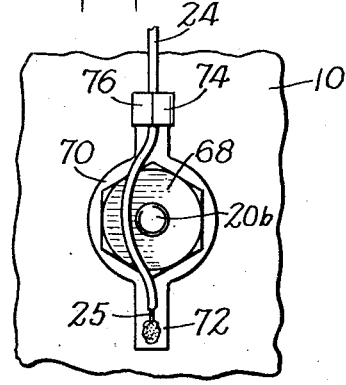
Figure 6 is a detail side elevation taken along lines 6—6 of Figure 3, particularly showing the manner in which the output lead wire is connected to the contact electrode.

Between the two nuts 66 and 68 is clamped a double-ended terminal 70 more clearly seen in Figure 6. The tip 25 of the output lead wire 24 is soldered to a lug 72 on the lower arm of this terminal 70, wire 24 extending upwardly around the stem portion 20b and through a barrel formed by two folded and crimped ears 74 and 76 on the terminal upper arm where the wire is firmly gripped and held in place. Such an arrangement provides sufficient lead flexibility to permit longitudinal adjustment of the shield tubes 28 and 30 (see Figure 1) for minimizing inductive pick-up (as more fully disclosed in U. S. patent application Serial No. 455,923, filed by Stocker S. Sturgeon, et al. on September 14, 1954) but assures that such flexing of the leads does not cause any cracks or breaks near the point of soldering.

Accordingly, it will be apparent that the structure disclosed herein achieves the several objects set forth above, and particularly provides a practical contact electrode arrangement for use with induction-type flowmeters. Such an arrangement is well adapted for economical manufacture, and is especially suited for applications where the fluid pressure is relatively high, since the pressure in the pipe tends to seat the electrode and the insulating liner more firmly in the pipe wall so as to assure a leakproof joint.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

I claim:
1. In an induction flowmeter wherein a magnetic field is caused to pass through the fluid whose flow rate is to be measured, the lines of force of said field being generally transverse of the direction of fluid flow, and wherein two electrodes are arranged to contact the fluid at points on a line generally transverse of the direction of fluid flow and also generally transverse of the magnetic field direction such that movement of the fluid causes a cutting of the magnetic lines of force and thereby generates a voltage between the contact electrodes proportional to the rate of fluid flow, the combination of: a section of pipe through which the fluid flows, the interior surface of said pipe section comprising a layer of electrically non-conductive material, a pair of conical holes extending through the wall of said pipe on opposite sides thereof and arranged with the larger aperture thereof facing the interior of the pipe, a pair of solid one-piece insulating liners in the form of hollow truncated cones each positioned in a respective one of said holes, a pair of generally cone-shaped metal fluid-contacting electrodes each fitted in the interior space of a respective one of said liners, the sides of said electrodes being formed to fit snugly against the sides of said liners, whereby fluid pressure in the interior of said pipe tends to press said electrodes and liners firmly against the sides of the holes to assure a leakproof connection of high mechanical strength, the inner faces of said liners in contact with said fluid being recessed slightly with respect to the inner surface of said pipe, the inner faces of said cone-shaped electrodes protruding slightly beyond said liners and said pipe inner surface to assure good electrical contact with said fluid and to minimize the build-up of sedimentary matter on said electrodes, circuit means connected to said electrode exteriorly of said pipe and adapted to couple the electromotive force generated between said electrodes by the movement of fluid through said pipe to electrical amplifier means, and means disposed external to said pipe and adapted to produce a magnetic field through said pipe generally transversely of the direction of fluid flow.

2. Induction flowmeter apparatus as claimed in claim 1, wherein said pipe section is formed of electrically conductive material, and said layer of electrically nonconductive material extends down into said holes covering the entire interior surfaces thereof to form an insulating barrier between said liners and the sides of said holes.

References Cited in the file of this patent
UNITED STATES PATENTS

| | | |
|---|---|---|
| 1,209,820 | Dunning | Dec. 26, 1916 |
| 2,616,949 | Cade | Nov. 4, 1952 |

FOREIGN PATENTS

| | | |
|---|---|---|
| 695,425 | Great Britain | Aug. 12, 1953 |